United States Patent
Minowa et al.

(10) Patent No.: US 7,366,228 B2
(45) Date of Patent: Apr. 29, 2008

(54) SYNCHRONIZATION DETECTING APPARATUS

(75) Inventors: Morihiko Minowa, Kawasaki (JP); Dai Kimura, Kawasaki (JP); Noriyuki Kawaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 818 days.

(21) Appl. No.: 09/918,964

(22) Filed: Jul. 31, 2001

(65) Prior Publication Data

US 2002/0093988 A1 Jul. 18, 2002

(30) Foreign Application Priority Data

Jan. 12, 2001 (JP) ............................. 2001-005208

(51) Int. Cl.
H04B 1/00 (2006.01)
(52) U.S. Cl. ...................... 375/149; 375/145; 375/130
(58) Field of Classification Search ............... 375/354, 375/130, 136, 147, 137, 149, 150, 152, 145
See application file for complete search history.

(56) References Cited

U.S. PATENT DOCUMENTS

| | | | | |
|---|---|---|---|---|
| 5,867,478 A * | 2/1999 | Baum et al. | ............... | 370/203 |
| 5,926,503 A * | 7/1999 | Kelton et al. | ............... | 375/148 |
| 5,991,273 A * | 11/1999 | Abu-Dayya | .................. | 370/252 |
| 6,049,577 A * | 4/2000 | Gothe et al. | ................. | 375/368 |
| 6,081,516 A * | 6/2000 | Yoshida et al. | ............. | 370/342 |
| 6,094,449 A * | 7/2000 | Komatsu | ..................... | 375/136 |
| 6,154,487 A * | 11/2000 | Murai et al. | ................. | 375/150 |
| 6,175,587 B1 * | 1/2001 | Madhow et al. | ............ | 375/148 |
| 6,175,588 B1 * | 1/2001 | Visotsky et al. | ............ | 375/148 |
| 6,246,676 B1 * | 6/2001 | Chen et al. | ................. | 370/342 |
| 6,289,228 B1 * | 9/2001 | Rotstein et al. | ............ | 455/574 |
| 6,345,078 B1 * | 2/2002 | Basso | .......................... | 375/349 |
| 6,438,157 B1 * | 8/2002 | Mamori | ..................... | 375/149 |
| 6,470,001 B1 * | 10/2002 | Kim et al. | .................. | 370/342 |
| 6,567,482 B1 * | 5/2003 | Popovic' | ..................... | 375/343 |
| 6,735,242 B1 * | 5/2004 | Kenney et al. | ............. | 375/150 |
| 6,775,340 B1 * | 8/2004 | Arslan et al. | ............... | 375/354 |
| 6,782,035 B1 * | 8/2004 | Nakamura et al. | .......... | 375/130 |
| 6,865,177 B1 * | 3/2005 | Park et al. | .................. | 370/350 |
| 6,904,078 B1 | 6/2005 | Abeta et al. | | |
| 2002/0169008 A1 * | 11/2002 | Hiben et al. | ................ | 455/574 |

(Continued)

FOREIGN PATENT DOCUMENTS

JP 07170223 7/1995

(Continued)

OTHER PUBLICATIONS

Notice of Rejection of Grounds dated Feb. 21, 2006 with translation.

*Primary Examiner*—Emmanuel Bayard
(74) *Attorney, Agent, or Firm*—Katten Muchin Rosenman LLP

(57) ABSTRACT

In a channel estimating circuit, a Sync Word is demodulated by using a channel estimation value not with a symbol or a slot including the Sync Word to be demodulated, but with its preceding and succeeding symbols or slots. Furthermore, in a channel estimation process, if a Synch Word to be demodulated is included in any of groups into which a plurality of symbols are divided, the Sync Word is demodulated by using a channel estimation value obtained with the channel estimation process using not this group but another group.

12 Claims, 20 Drawing Sheets

U.S. PATENT DOCUMENTS

2004/0071193 A1* 4/2004 Atarashi et al. ............ 375/144
2004/0266354 A1* 12/2004 Hamada et al. ............ 455/63.4
2006/0280230 A1* 12/2006 Dabak et al. ............... 375/146

FOREIGN PATENT DOCUMENTS

| JP | 2003-501875 | 1/2003 |
|---|---|---|
| WO | WO 98/47246 | 10/1998 |
| WO | WO 99/55033 | 10/1999 |
| WO | WO 00/74290 | 12/2000 |

* cited by examiner

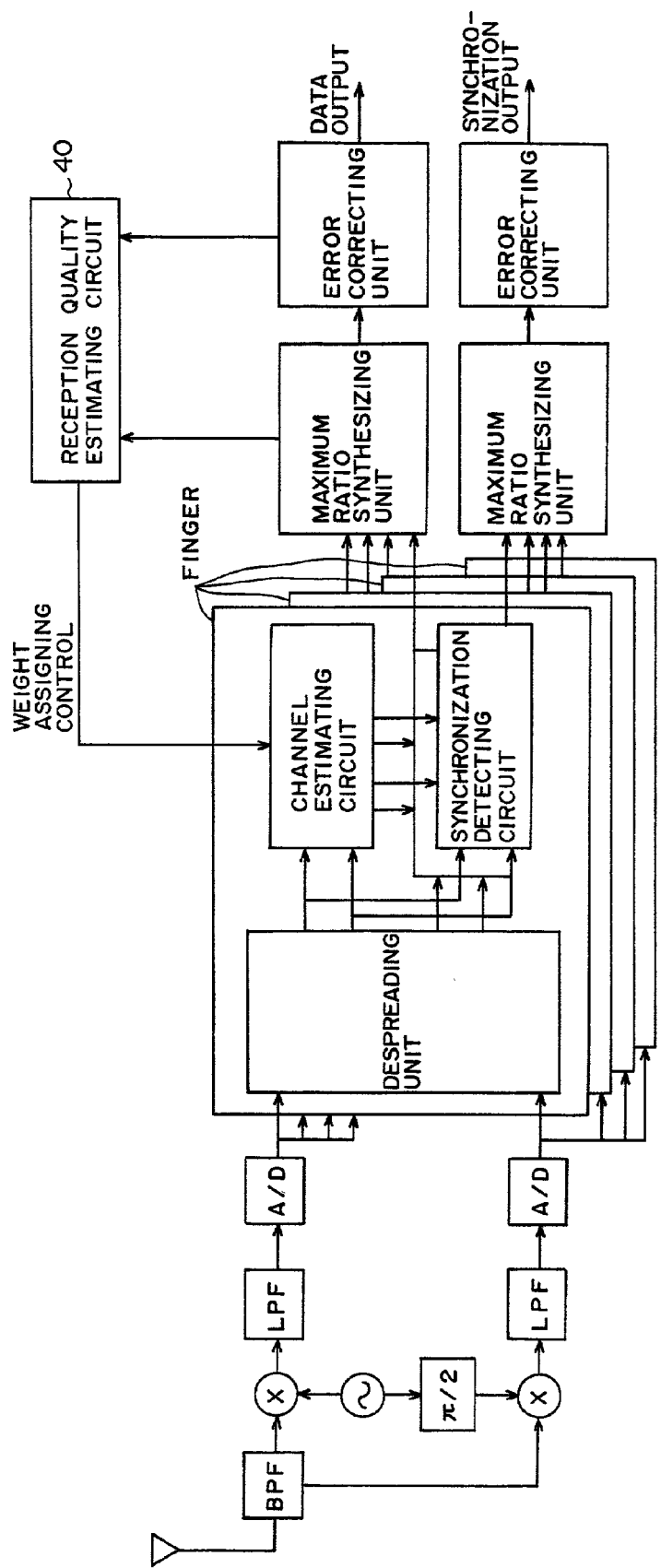
F I G. 14

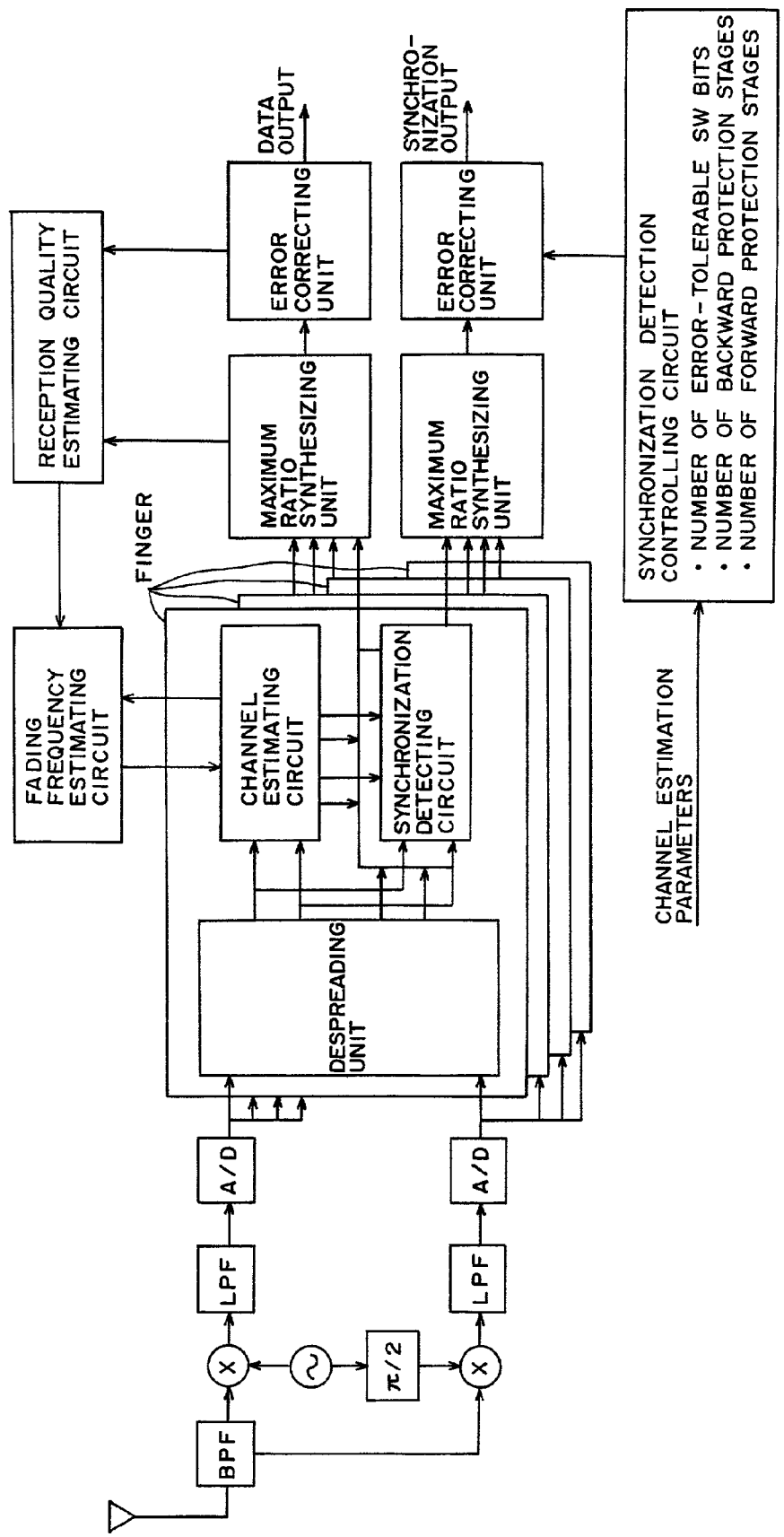
F I G. 16

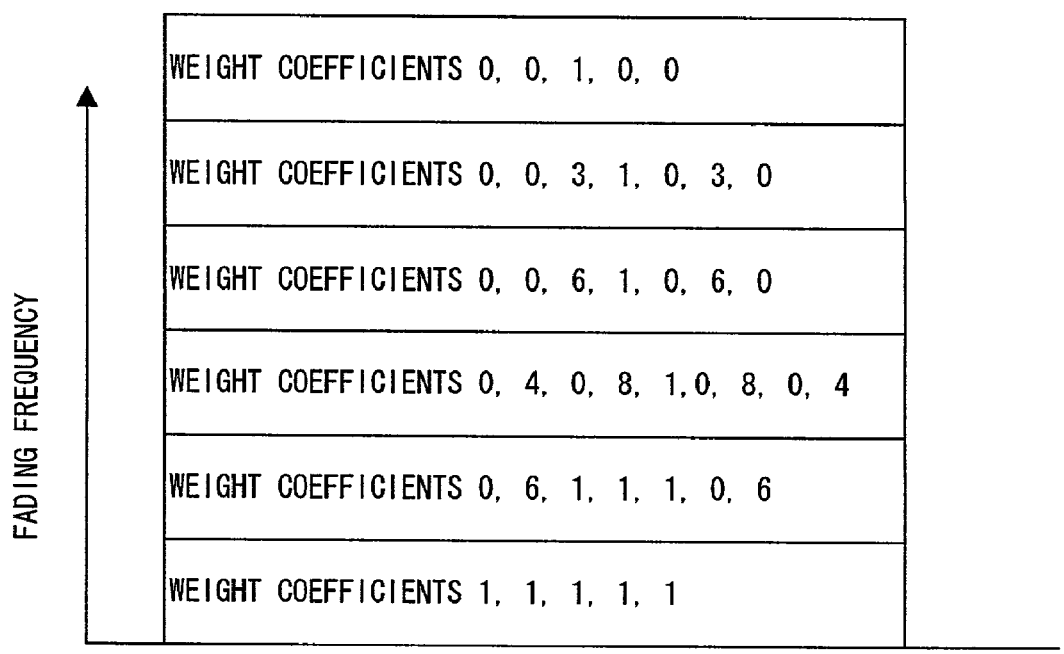
F I G. 1 7

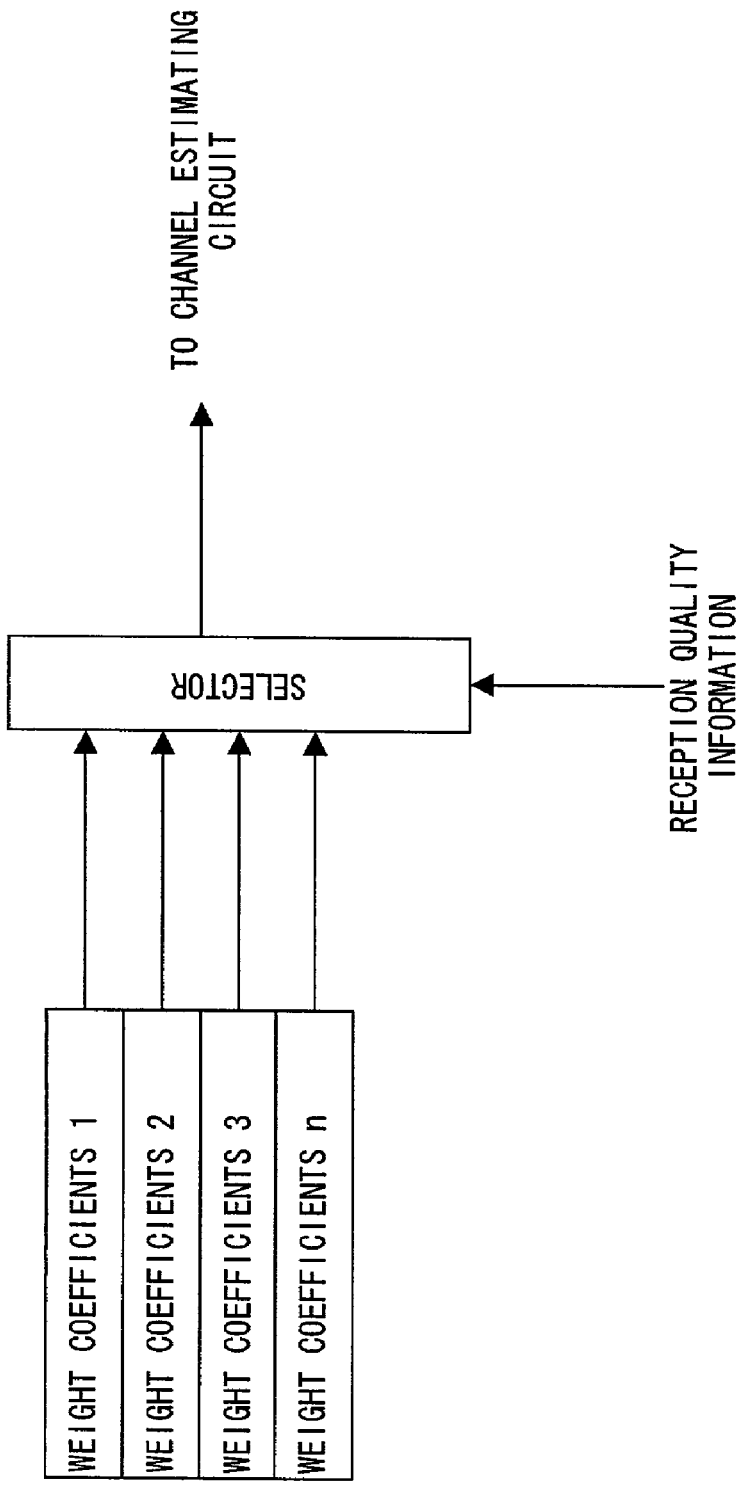
F I G. 1 9

SYNCHRONIZATION DETECTING APPARATUS

BACKGROUND OF THE INVENTION

1. Field of the Invention

The present invention relates to a synchronization detecting apparatus for a wireless signal transmission line, which is comprised by a CDMA (Code Division Multiple Access) system receiver.

2. Description of the Related Art

A CDMA system attempts to improve its reception quality by using RAKE reception, which is pat diversity (plus space diversity reception (antenna diversity reception)). In a signal format of a W-CDMA (Wideband Code Division Multiple Access) system, a synchronization signal (Sync Word: hereinafter referred to simply as an SW) for detecting synchronization is multiplexed on a pilot signal, and the SW is demodulated by a receiver to detect synchronization. The RAKE receiver makes estimation (channel estimation) for the stare of a propagation path by using a pilot signal included in a reception signal containing a lot of noise, makes synchronization detection, and the synthesizes pats so as to demodulate data.

FIG. 1 shows the configuration of a conventional receiver.

In this figure, a synchronization detection process is performed for an SW signal multiplexed on a pilot signal and a data signal.

A signal input from an antenna 10 is converted into baseband signals by a demodulating unit 11, and these signals are further convened into digital signals by A/D converters 12-1 and 12-2. The convened signals are input to a despreading unit 13. Here, a CDMA despreading process is performed, and the despread signals are input to a synchronization detecting circuit 14-1 for demodulating data and a synchronization detecting circuit 14-2 for demodulating an SW. In FIG. 1, there are two systems of the synchronization detecting circuits 14-1 and 14-2 and channel estimating circuits 15-1 and 15-2, and a plurality of fingers are shown as a CDMA RAKE receiver. After a maximum ratio synthesizing unit 16-1 synthesizes the outputs of the fingers, an error correcting unit 17 performs an error correction process for the synthesized output. The data is then output Similarly, after a maximum ratio synthesizing unit 16-2 synthesizes the outputs of the synchronization detecting circuit 14-2 for demodulating an SW at a maximum ratio, a synchronization detecting unit 18 performs a synchronization detection process for the synthesized output to determine synchronization.

Additionally, actual channel estimating circuit and synchronization detecting circuits are configured to handle a signal to be processed as a complex baseband signal.

FIG. 2 exemplifies the format of a CDMA system frame.

1 frame is composed of 15 slots, and an SW is multiplexed on a pilot signal that is used when a reception signal is demodulated. Synchronization is determined by using the SW.

In the meantime, with a channel estimation method, channel estimation is made for example, by using pilot symbols in preceding and succeeding slots so as to improve the S/N ratio of a pilot signal, as shown in the configuration of a channel estimating circuit exemplified in FIG. 3. Within a slot, in-phase synthesis is made for a plurality of pilot signals from which a pilot pattern is removed. In-phase synthesis is also made for slots, and a channel estimation value for demodulation is generated by making synthesis with weight coefficients. The weight coefficients are varied depending on the state of a propagation path.

However, an SW itself is included in a channel estimation result when the SW is demodulated by using a channel estimation result, which becomes a reference at the time of synchronization detection. Therefore, the correlation between a channel estimation result and an SW becomes strong depending on weight coefficients and the number of pilot symbols. As a result, an SW does not become erroneous (for example, the SW does not become erroneous by 99 percent) even if no signal is input. An SW is included in a pilot signal used for channel estimation. Therefore, if the number of bits of the SW included in the pilot signal becomes relatively large, channel estimation is made almost based on the SW. Consequently, the phase of a signal is rotated, etc. with reference to the SW. That is, the SW is handled as being correct. If a result of the channel estimation made by using a pilot signal indicates the degree of susceptibility to SW bits as described above, the correlation between a channel estimation result and an SW is referred to as being strong or weak.

Accordingly, if a portable terminal is powered down, a base station side determines that a communication is terminated based on the phenomenon that the portable terminal goes out of synchronization, and releases the channel allocated to the portable terminal. However, if an SW does not become erroneous even if the portable terminal is powered down, the base station determines that the communication still continues although the portable terminal is actually powered down. Accordingly, a trigger for releasing the channel cannot be obtained despite a long wait, although the portable terminal must terminate the communication and the channel must be released.

FIG. 4 is a graph showing the error rate characteristic of a normal signal.

It is proved from this figure that if reception quality is deteriorated, an error rate and a non-error rate become equal, and the error rate results in 0.5. However, if weight coefficients shown in FIG. 3 are set to (1, 1, 1, 1, 1), the SW error rate results in a rate shown in FIG. 5 when an SW signal is demodulated. That is, the error rate results in 0.15 although reception quality is bad.

Furthermore, the error rate characteristic obtained when a signal is demodulated on the condition that the weight coefficients are set to 0, 0, 1, 0, 0 is shown in FIG. 6. It is proved from this figure that the error rate is on the order of 0.05 although reception quality is bad.

As described above, the SW error rate may not deteriorate even though reception quality is bad. If a process is being performed based upon the SW error rate the process could continue even though radio waves are not being transmitted from a portable terminal.

SUMMARY OF THE INVENTION

A synchronization detecting apparatus according to the present invention, detects synchronization by using a pilot signal. The pilot siaial includes a plurality of bits and at least one specific bit of said plurality of bits is used as a synchronization signal. The synchronization detecting apparatus includes a channel estimating unit making channel estimation by using the pilot signal from which a predefined part of the pilot signal is removed; and a synchronization signal demodulating unit demodulating each bit of the synchronization signal by using a result of the channel estimation, The above predefined part is defined for each target bit of the synchronization signal to be demodulated and is defined so as to include the target bit; and synchronization detection is made by using the demodulated synchronization signal.

BRIEF DESCRIPTION OF THE DRAWINGS

FIG. 14 explains a fifth preferred embodiment according to the present invention;
FIG. 16 exemplifies the configuration of a receiver according to a seventh preferred embodiment of the present invention (No. 1);
FIG. 17 exemplifies the configuration of the receiver according to the seventh preferred embodiment of the present invention (No. 2);
FIG. 19 shows the configuration of blocks of a weight coefficient selecting circuit.

DESCRIPTION OF THE PREFERRED EMBODIMENTS

Figure 1:
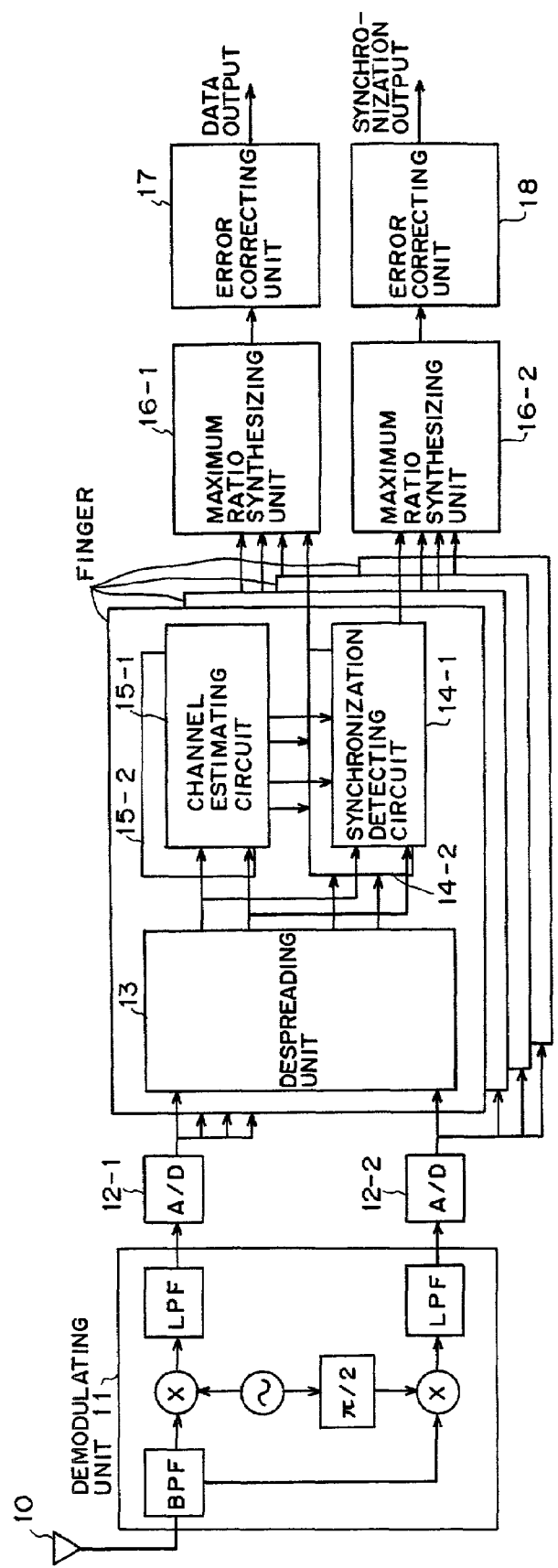
FIG. 1 shows the configuration of a conventional receiver.
Figure 2:
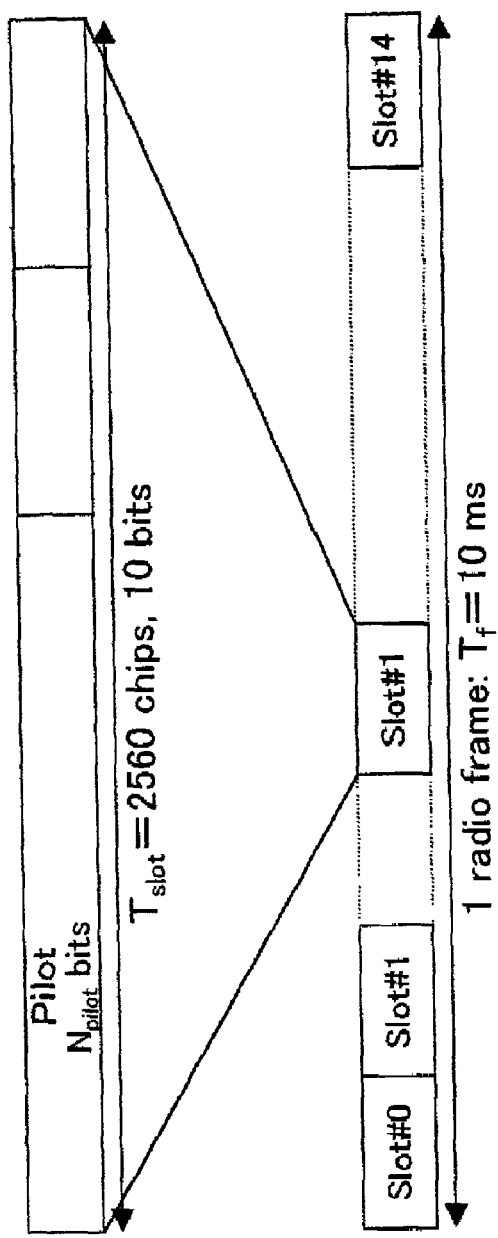
FIG. 2 exemplifies the format of a CDMA system frame.

The following description omits the explanations of the same constituent elements as those of the receiver shown in FIG. 1.

In preferred embodiments according to the present invention, if the correlation between a channel estimation value and a SW bit is expected to be strong, the SW bit is removed from the channel estimation value to weaken the correlation with the SW bit to be demodulated. This is because an SW cannot be properly detected if the correlation between a channel estimation result and an SW bit to be demodulated is strong.

With the above described method, the correlation between a channel estimation value and an SW bit is removed, thereby properly detecting an SW.

Figure 7:
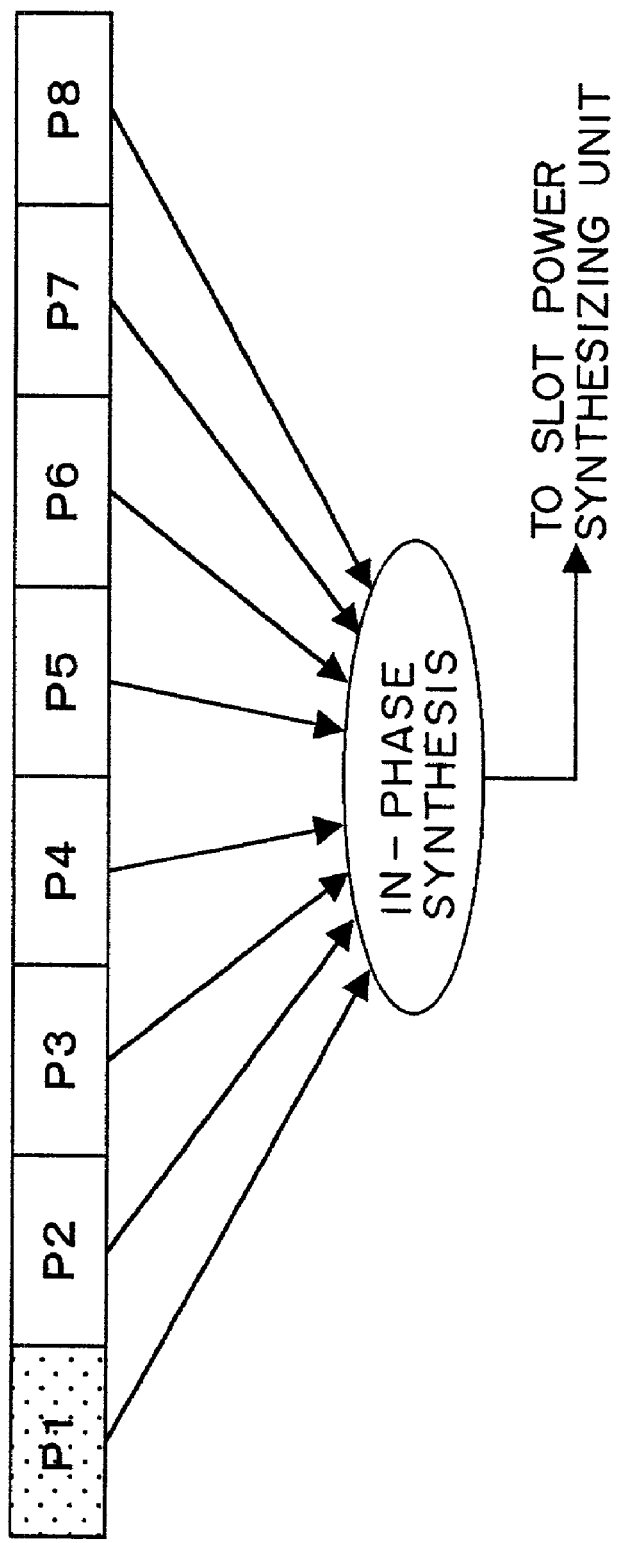
FIG. 7 shows a first preferred embodiment.

FIG. 7 shows a first preferred embodiment according to the present invention.

Figure 3:
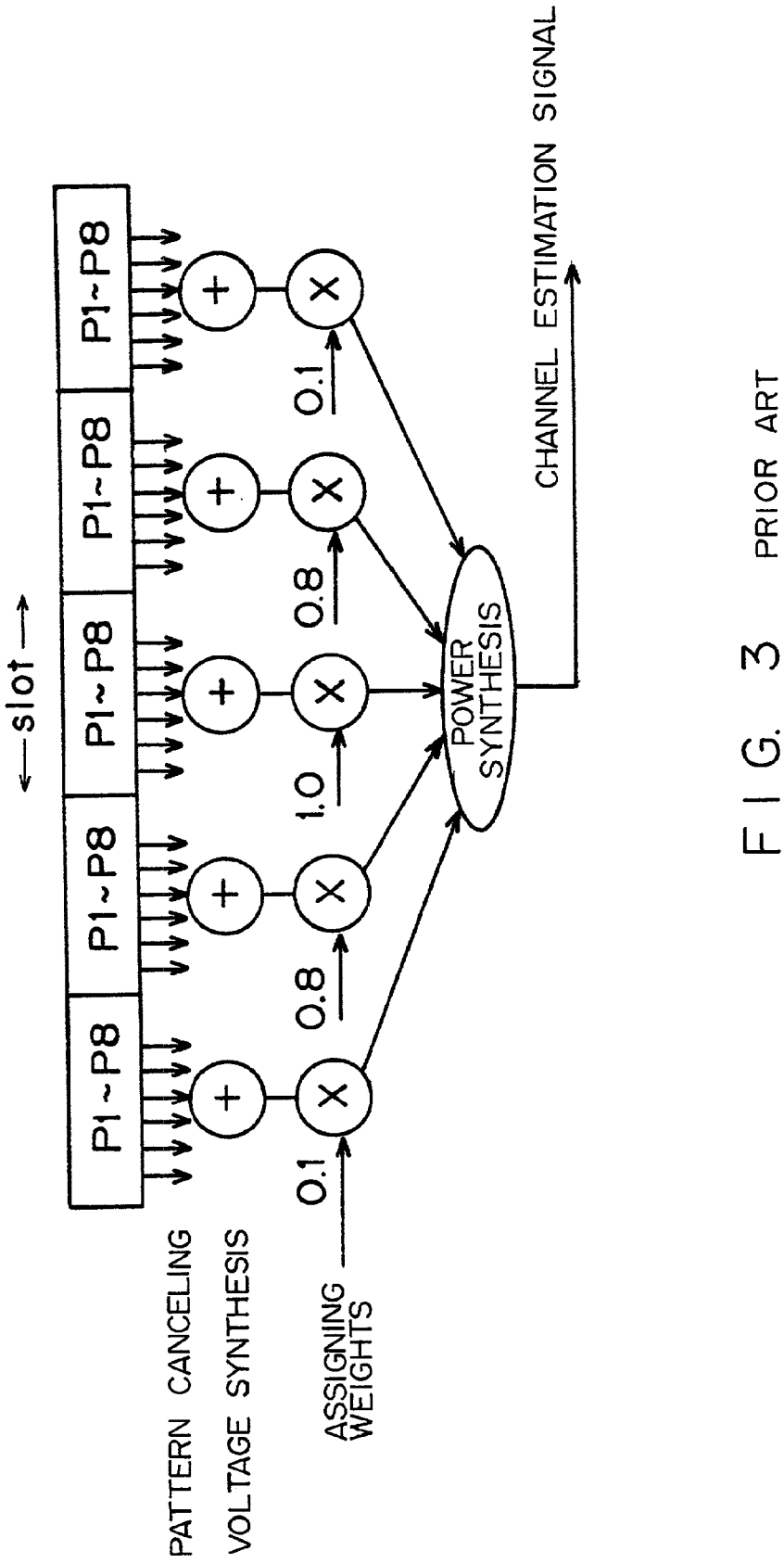
FIG. 3 exemplifies the configuration of a channel estimating circuit.
Figure 4:
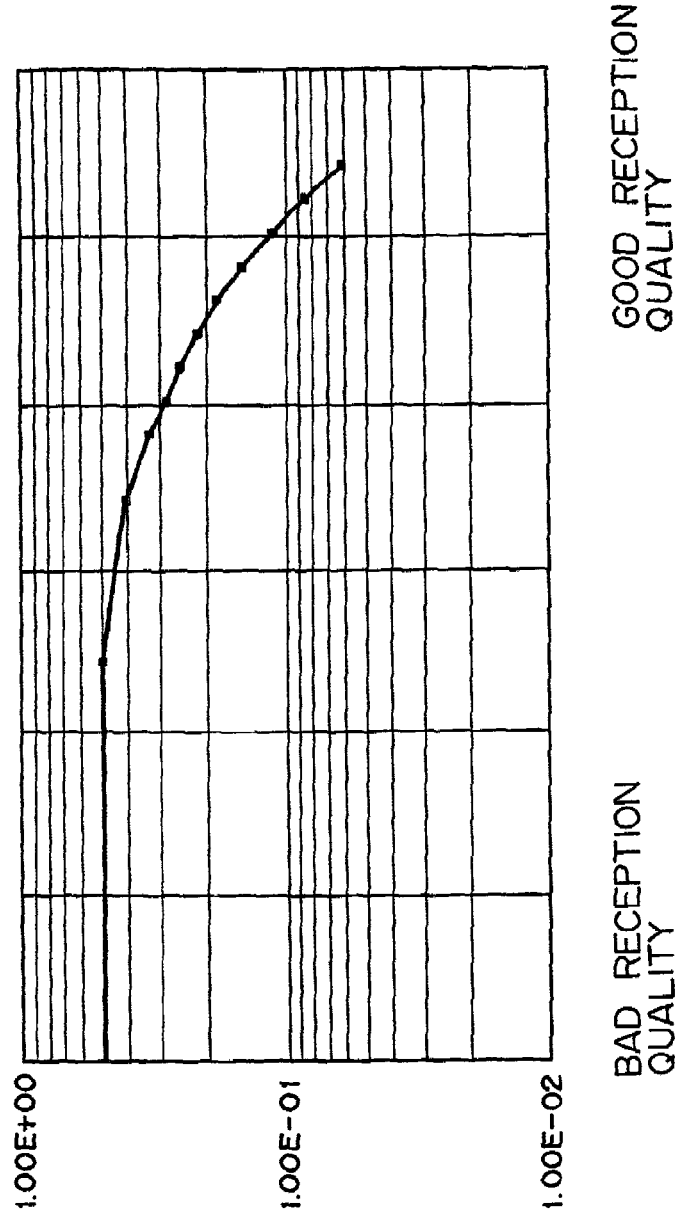
FIG. 4 is a graph representing an error rate characteristic (No. 1)

This figure shows 1 slot of the channel estimating circuit exemplified in FIG. 3. If a symbol to be demodulated is a symbol P1 as shown in FIG. 7, this symbol is demodulated with a channel estimation value using symbols P2 through P8 (1 slot is composed of 8 bits in this case) other than the symbol P1. Similarly, if a symbol P2 is to be demodulated, this symbol is demodulated with a channel estimation value using the symbols other than the symbol P2. In this way, the correlation between the channel estimation value and the SW bit (the symbol P1 or P2 in the above provided example) is eliminated, whereby an error rate can be set to on the order of 0.5 in a state where no signal is input.

Figure 8:
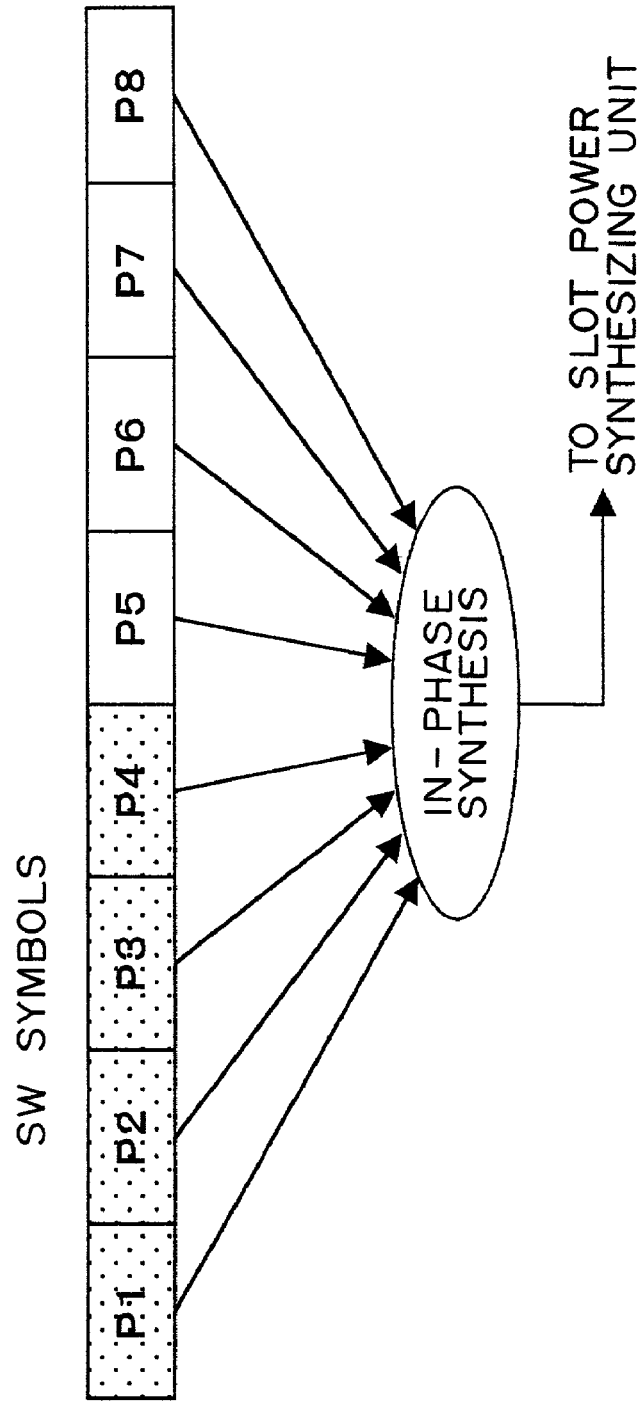
FIG. 8 shows a second preferred embodiment.

FIG. 8 shows a second preferred embodiment according to the present invention.

As shown in this figure, if 4 SW symbols are multiplexed on an actual pilot symbol, SW detection is enabled if the correlation between a channel estimation value and the 4 SW symbols is removed. However, this increases control complexity. Therefore, a channel estimation value is generated with pilot symbols other than the SW symbols, so that synchronization detection is made.

Namely, in the example shown in FIG. 8, symbols P1 to P4 are SW symbols, and a channel estimation value is calculated with symbols P5 to P8. That is, only the amplitude values of the symbols P5 to P8 are in-phase-synthesized by being assigned weights in accordance with the circuit configuration shown in FIG. 3.

Figure 9:
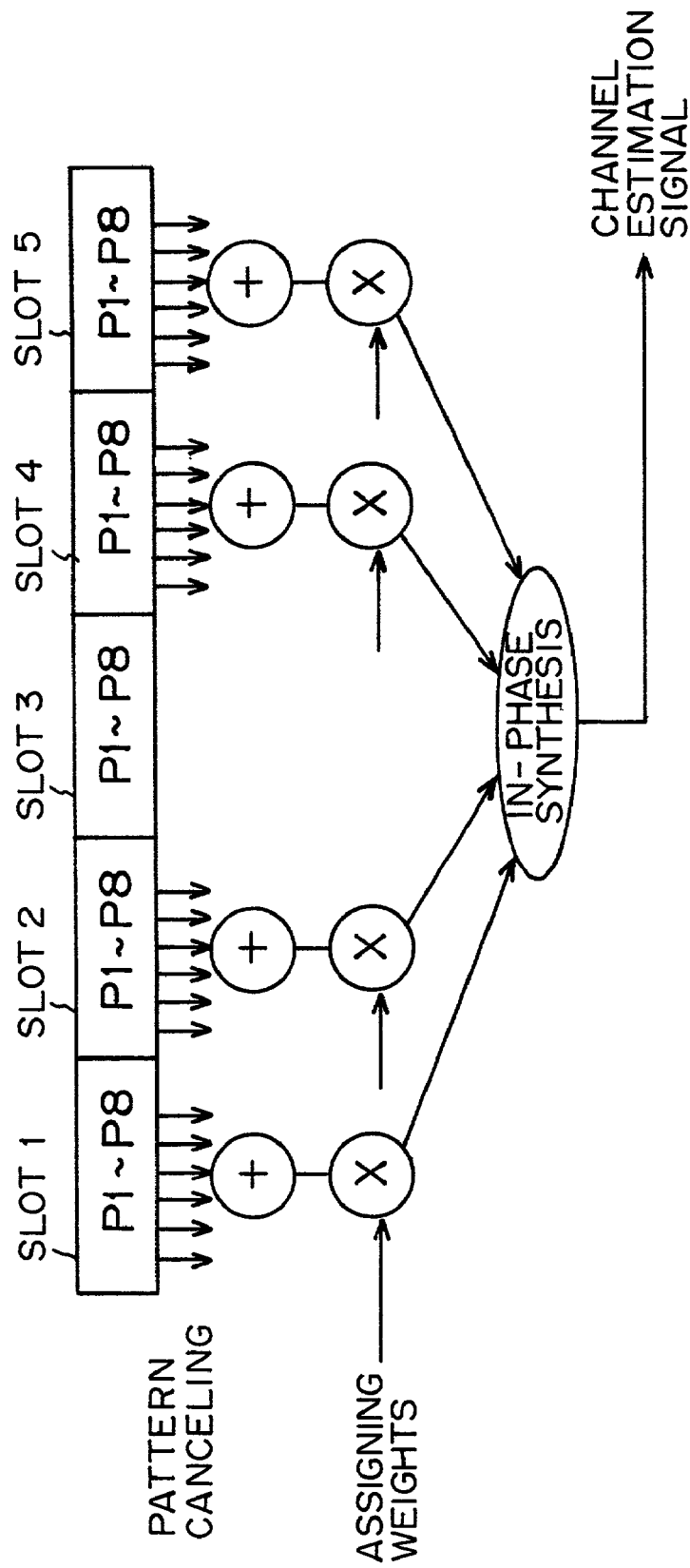
FIG. 9 shows a third preferred embodiment.

FIG. 9 shows a third preferred embodiment according to the present invention.

As shown in this figure, a correlation is removed by not a pilot signal in a slot to be demodulated, but pilot symbols in preceding and succeeding slots. Namely, no process is performed for a slot 3 including an SW symbol to be demodulated, and the amplitude values of symbols in slots 1, 2, 4, and 5 are in-phase-synthesized by being assigned weights, so that a channel estimation signal is generated.

Figure 10:
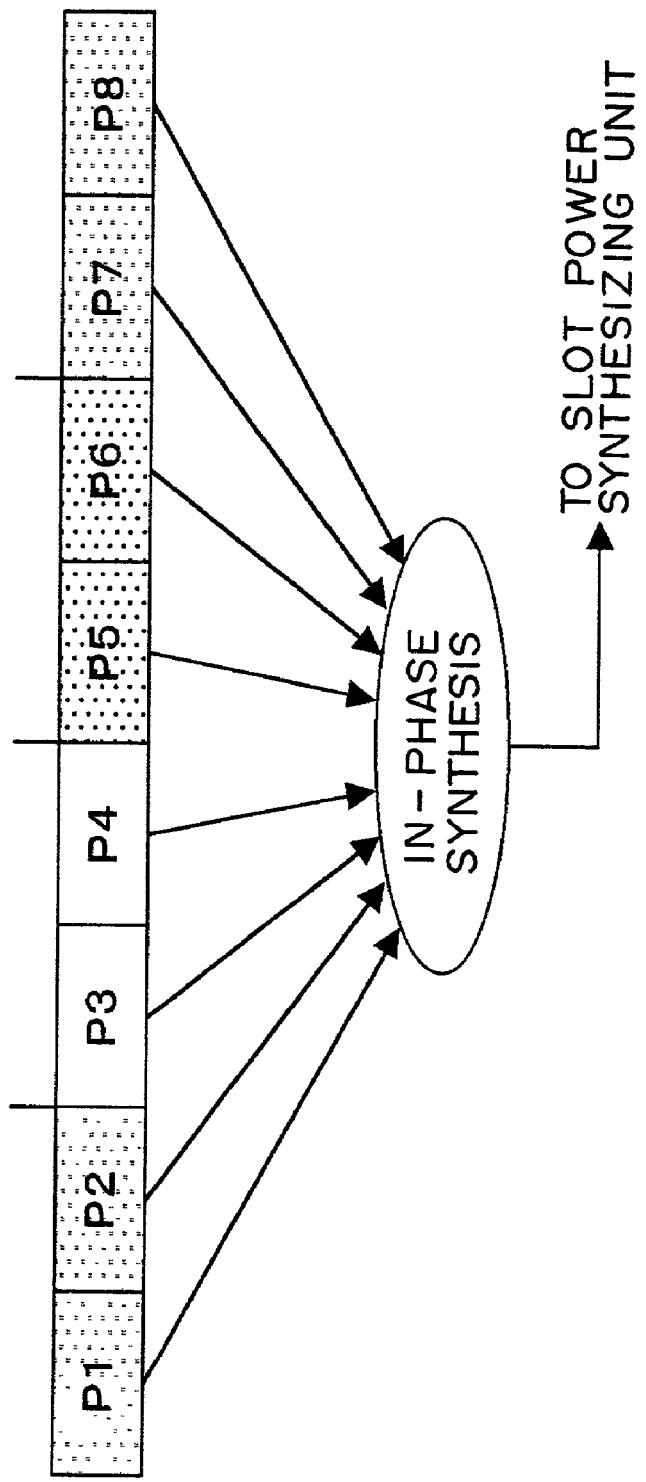
FIG. 10 shows a fourth preferred embodiment.

FIG. 10 shows a fourth preferred embodiment according to the present invention.

As shown in this figure, pilot symbols are divided into group each composed of 2 symbols, and a pilot signal including an SW symbol is not used for each group to make channel estimation, thereby removing the correlation between a channel estimation value and an SW.

Figure 11:
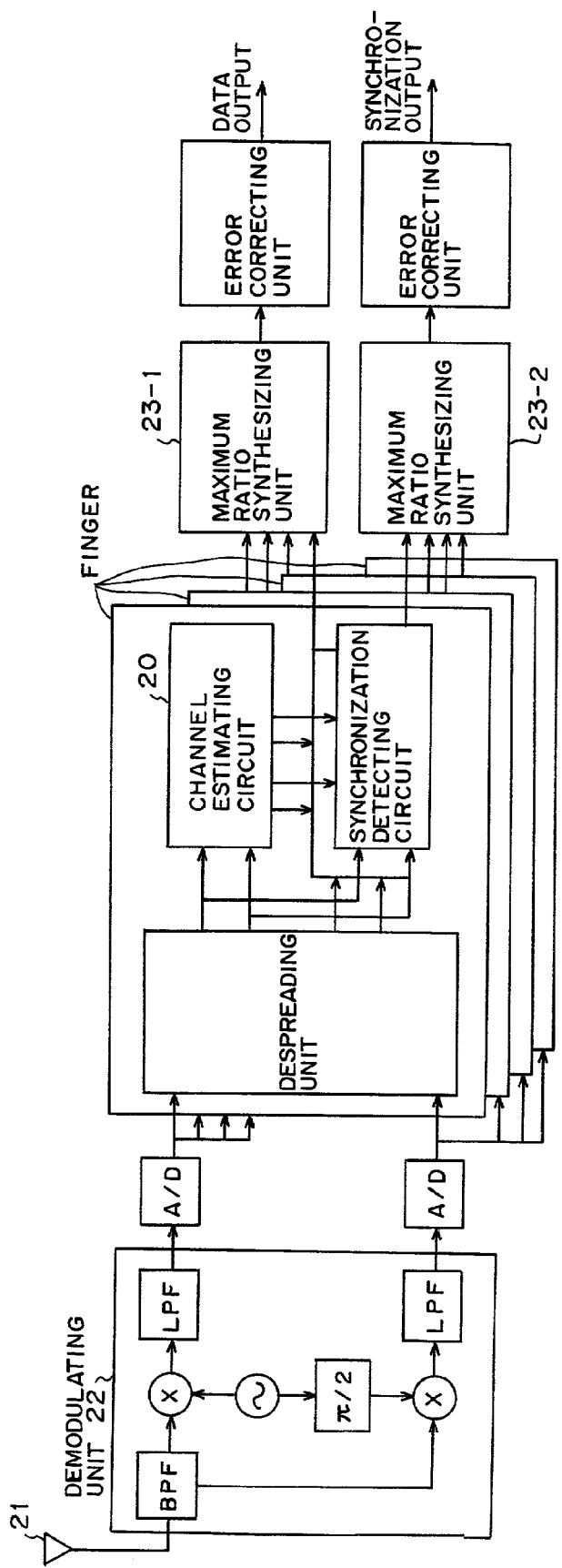
FIG. 11 shows the configuration of a receiver according to a preferred embodiment of the present invention.

FIG. 11 shows the configuration of a receiver according to a preferred embodiment of the present invention.

As shown in this figure, 2 conventional channel estimating circuits 20 for detecting synchronization and for demodulating data are put into one for common use, thereby reducing the circuit scale. As a result, use, thereby reducing the circuit scale. As a result, a signal received by an antenna 21 is converted into complex baseband signals I (in-phase) and Q (quadrature phase), which are ten converted into digital signals via A/D converters. The convened digital signals are despread by fingers, and channel-estimated by the channel estimating unit. Then, synchronization detection is made by using a channel estimation value, which is a result of the channel estimation, and a data signal and a synchronization signal are synthesized at a maximum ratio by maximum ratio synthesizing units 23-1 and 23-2. Thereafter, the data signal is error-corrected and results in a data output, whereas the synchronization signal is synchronization-detected and results in a synchronization output.

Figure 12:
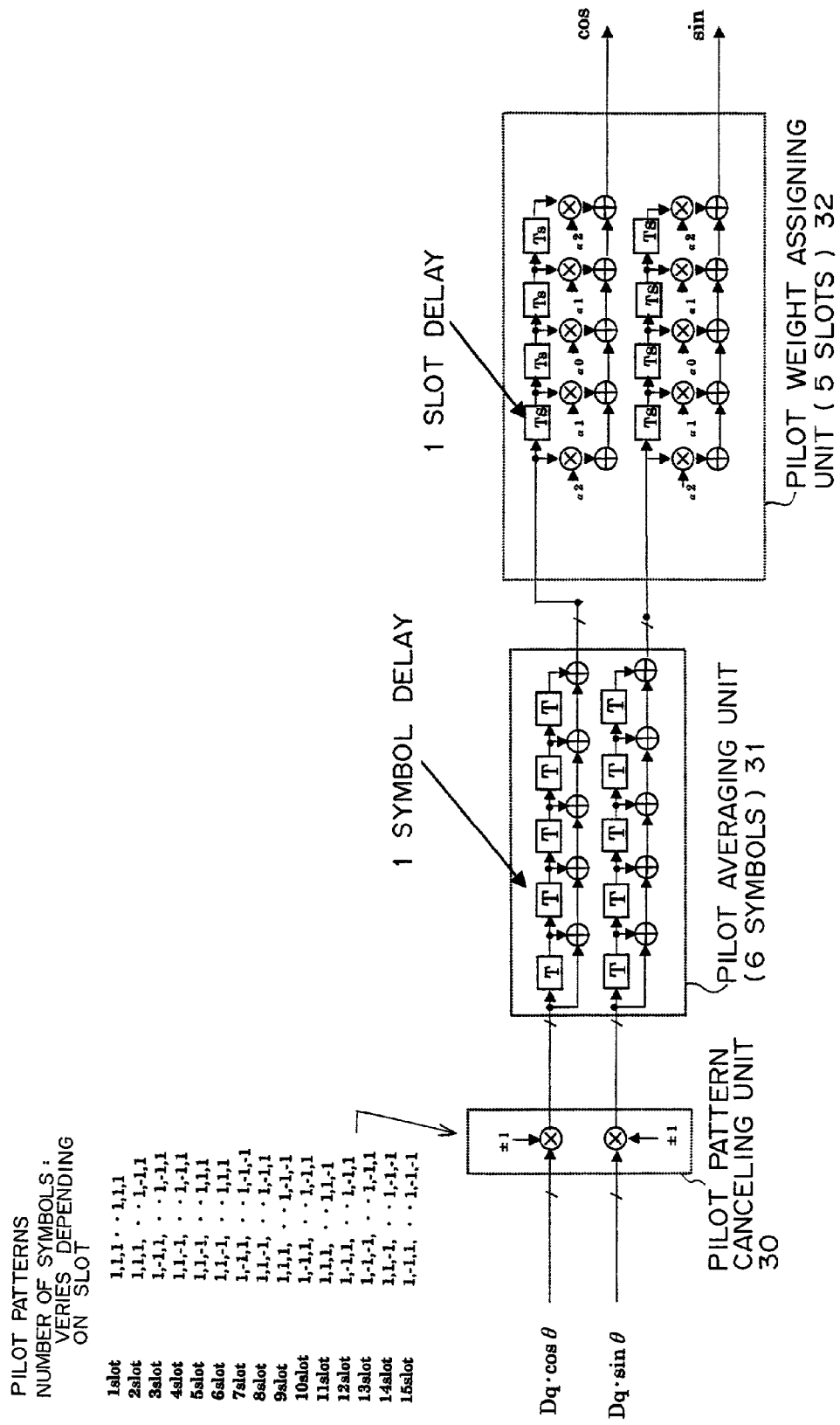
FIG. 12 exemplifies the circuit configuration of a channel estimating unit.

FIG. 12 exemplifies the circuit configuration of a channel estimating unit.

Pilot patterns are predetermined, and a different pattern is used depending on the number of symbols and a slot. In FIG. 12, $Dq \cdot \cos\theta$ and $Dq \cdot \sin\theta$ structure a complex baseband signal. Additionally, this figure shows that pilot symbols exist are assigned with 0 symbol. The complex baseband signal is multiplied by a predetermined pilot pattern by a pilot pattern canceling unit 30 to cancel the pilot pattern. As a result, the pilot pattern results in a state where "1" successively exists if the amplitude does not change or the phase does not rotate. The pattern is input to a pilot averaging unit 31, which respectively adds 6 symbols of I and Q signals. The addition results are assigned weights and output by a pilot weight assigning unit 32. A maximum ratio synthesizing unit is arranged at a stage succeeding this circuit.

Here, according to the preferred embodiment of the present invention, a bit, a group, or a slot including an SW to be demodulated is subtracted at a stage preceding this circuit, and is not input to the channel estimating circuit shown in FIG. 12. This can be easily implemented by arranging a selector, a subtracter, etc. at the stage preceding the channel estimating circuit shown in FIG. 12, and by making the selector, the subtracter, etc. operate at the timing when a symbol, a group, or a slot including an SW to be demodulated is input.

Figure 13:
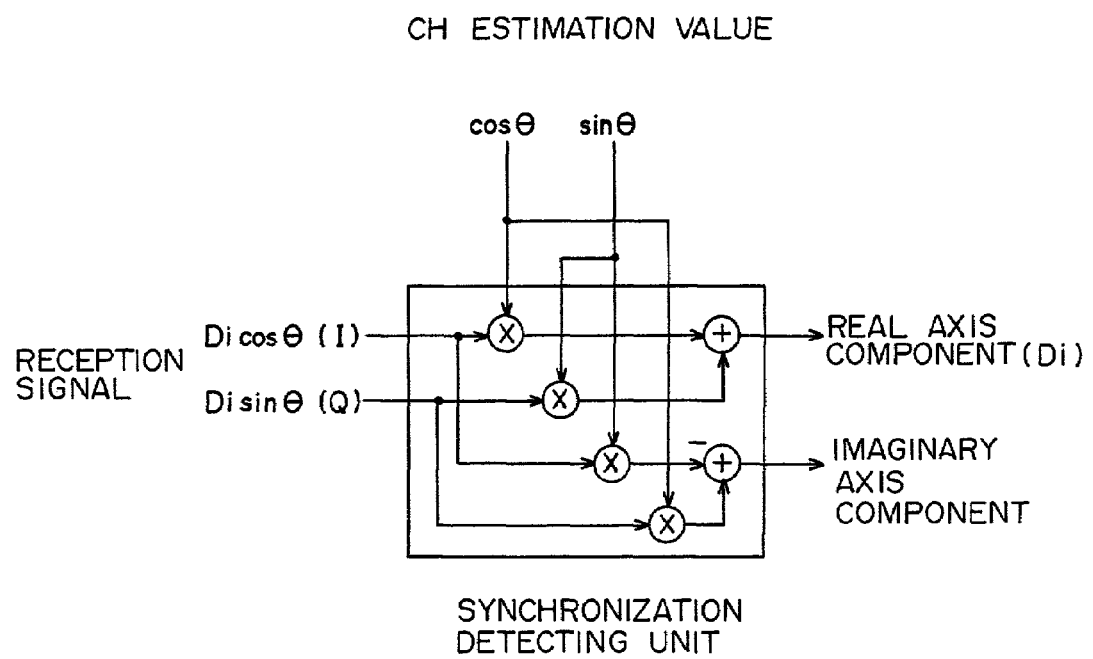
FIG. 13 exemplifies the circuit configuration of a synchronization detecting unit.

FIG. 13 exemplifies the circuit configuration of a synchronization detecting unit.

A reception signal is input to a synchronization detecting unit as a complex baseband signal composed of I and Q signals after being demodulated. Here, a channel estimation value is complex-multiplied, and its result is output as a real axis component and an imaginary axis component. The reason why multipliers and signals input thereto are complex in this figure is that a channel estimation value is complex-multiplied for a complex baseband signal. The complex multiplication is to reproduce the same arithmetic operation as complex number multiplication. The complex number multiplication is reproduced by assuming that the I and the Q signals are respectively the real and the imaginary components of an input signal, and also a channel estimation value is composed of real and imaginary components. Although its circuit becomes complex, the two orthogonal components of the signal itself can be handled as one complex signal, which facilitates the handling of this signal.

Figure 5:
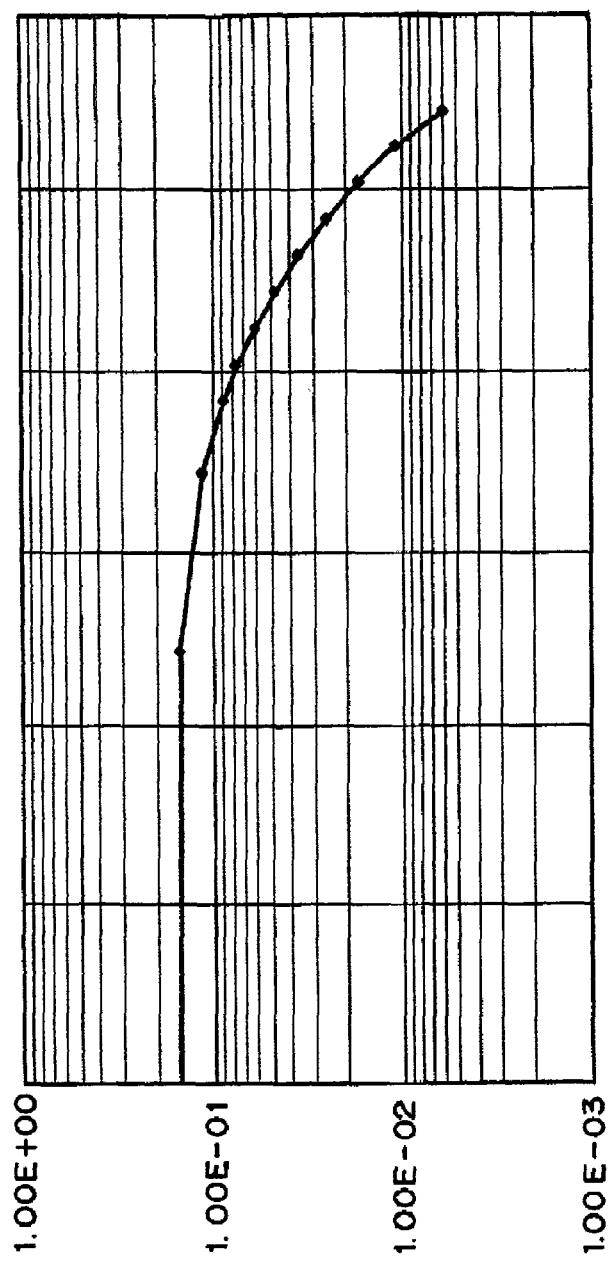
FIG. 5 is a graph representing an error rate characteristic (NO. 2)
Figure 6:
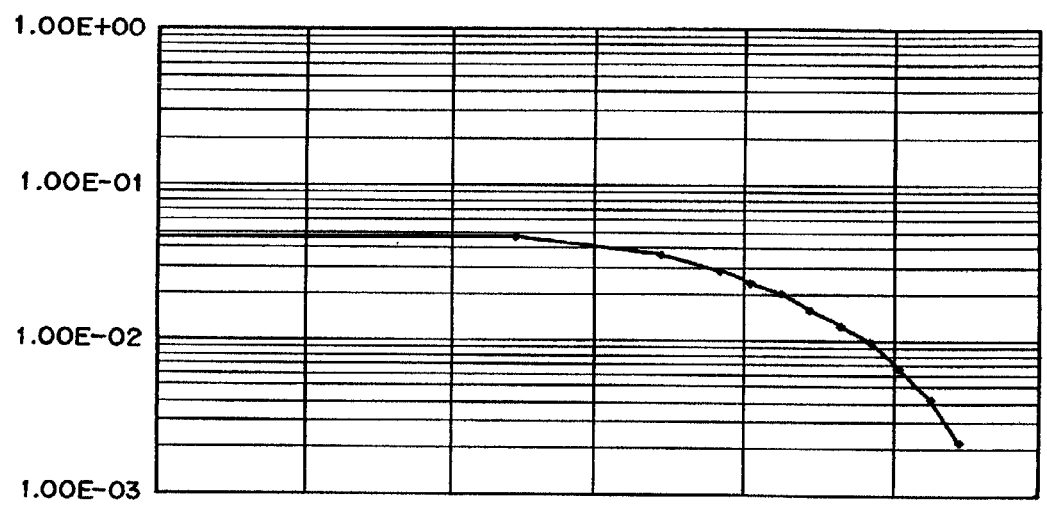
FIG. 6 is a graph representing an error rate characteristic (No. 3)

Additionally, the correlation between a channel estimation value and an SW symbol can be weakened by always setting to, for example, 1, 1, 1, 1, 1, the weight coefficients of a channel estimating circuit having a conventional configuration shown in FIG. 3 independently from the weight coefficients for demodulating data. If a comparison is made between the SW error rates shown in FIGS. 5 and 6, deterioration of the SW error rate estimation is improved by setting the weight coefficients as described above.

FIG. 14 shows a fifth preferred embodiment according to the present invention.

As shown in this figure, a receiver according to this preferred embodiment comprises a reception quality estimating circuit 40, and weakens the correlation between an SW bit and a channel estimation value by switching channel estimation weight coefficients for SW detection if signal quality is bad.

Furthermore, the process for weakening the correlation between a channel estimation value and an SW, which is referred to in the above described preferred embodiment, may be also performed only if a reception signal such as a packet transmission signal is proved to become a burst signal. By applying this method, the amount of the channel estimation process is expected to be reduced.

Figure 15:
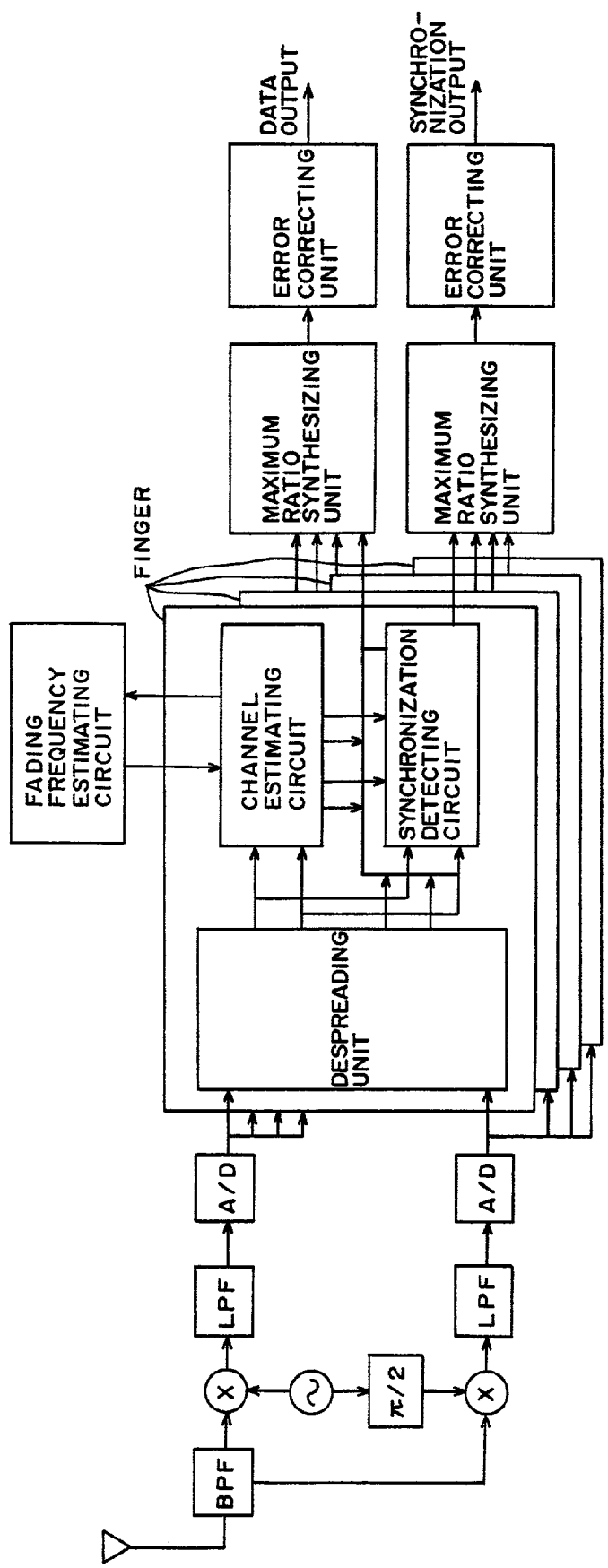
FIG. 15 shows a CDMA receiver comprising a fading frequency estimating circuit, according to a sixth preferred embodiment of the present invention.

FIG. 15 shows a preferred embodiment of a CDMA receiver comprising a fading frequency estimating circuit, according to a sixth preferred embodiment of the present invention.

In this case, weight coefficients for channel estimation are controlled with a fading frequency. The reception characteristic can be improved by setting the weight coefficients to, for example, 0, 0, 1, 0, 0 if fading is high-speed, or by setting the weight coefficients to, for example, 1, 1, 1, 1, 1 if there is no fading. However, with the weight coefficients in the case of high-speed fading, the correlation between a channel estimation value and an SW becomes significantly strong, which makes proper SW detection difficult. Therefore, the process for weakening the correlation between a channel estimation value and an SW according to the above described preferred embodiment is performed at the time of high-speed fading.

Figure 18:
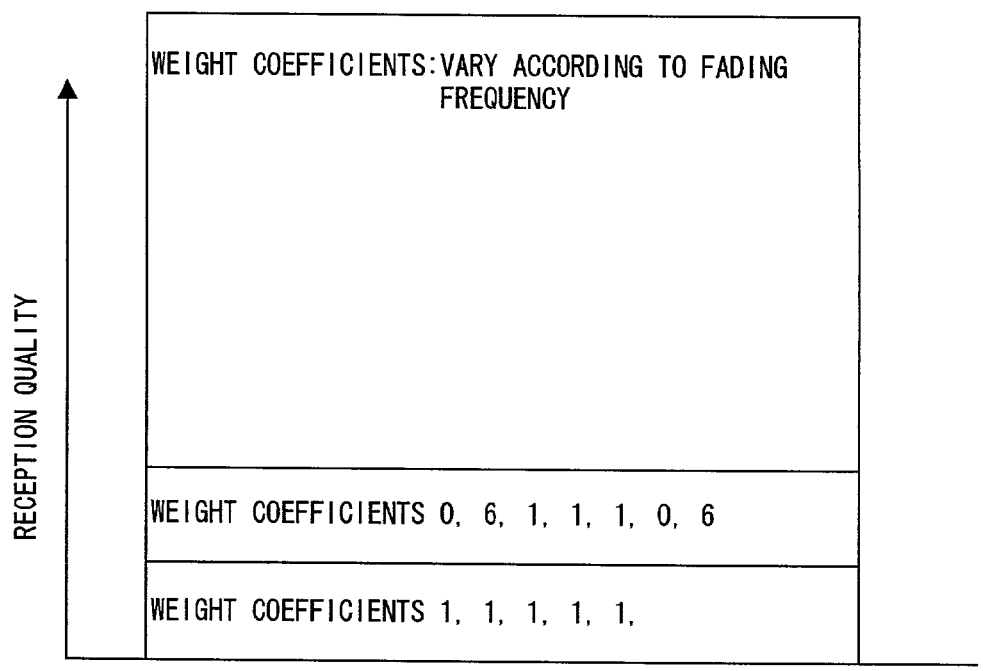
FIG. 18 exemplifies the configuration of the receiver according to the seventh preferred embodiment of the present invention (No. 3)

FIGS. 16 through 18 exemplify the configuration of a receiver according to a seventh preferred embodiment of the present invention.

In this preferred embodiment, both a fading frequency estimating circuit and a reception quality estimating circuit are arranged, and weight coefficients settings are varied by using both a fading frequency and a reception quality as parameters.

That is, a plurality of weight coefficients are prepared, and switched and used with a change in the fading frequency in a similar manner as in the preferred embodiment shown in FIG. 15.

Additionally, as shown in FIG. 18, prepared weight coefficients are switched and used if reception quality is bad. As the reception quality becomes better, the weight coefficients are varied according to a fading frequency as shown in FIG. 17.

Furthermore, as shown in FIG. 16, channel estimation parameters vary according to the number of pilot symbols, fading speed, etc. It is effective that a plurality of parameters such as the number of error-tolerable SW bits for synchronization detection, the number of forward protection stages, the number of backward protection stages, etc. are prepared, and switched according to the channel estimation parameters.

Or, since the channel estimation parameters change according to the number of pilot symbols, fading speed, etc., it is also possible to manage by an upper layer the parameters such as the number of error-tolerable SW bits for synchronization detection, the number of forward protection stages, the number of backward protection stages, etc., and to vary the parameters depending on need.

In FIG. 16, the fading frequency estimating circuit and the reception quality estimating circuit are arranged. In addition, a synchronization detection controlling circuit determines the number of error-tolerable SW bits, the number of backward protection stages, the number of forward protection stages, etc. by using the channel estimation parameters as inputs, and inputs the determined parameters to a synchronization detecting circuit, which detects synchronization according to the parameters.

FIG. 19 shows the configuration of blocks of a weight coefficient selecting circuit.

In the weight coefficient selecting circuit, weight coefficients 1 through n are prepared. Upon receipt of reception quality information, a selector selects a suitable weight coefficient, and outputs the selected coefficient to a channel estimating circuit of a channel estimating unit.

Figure 20:
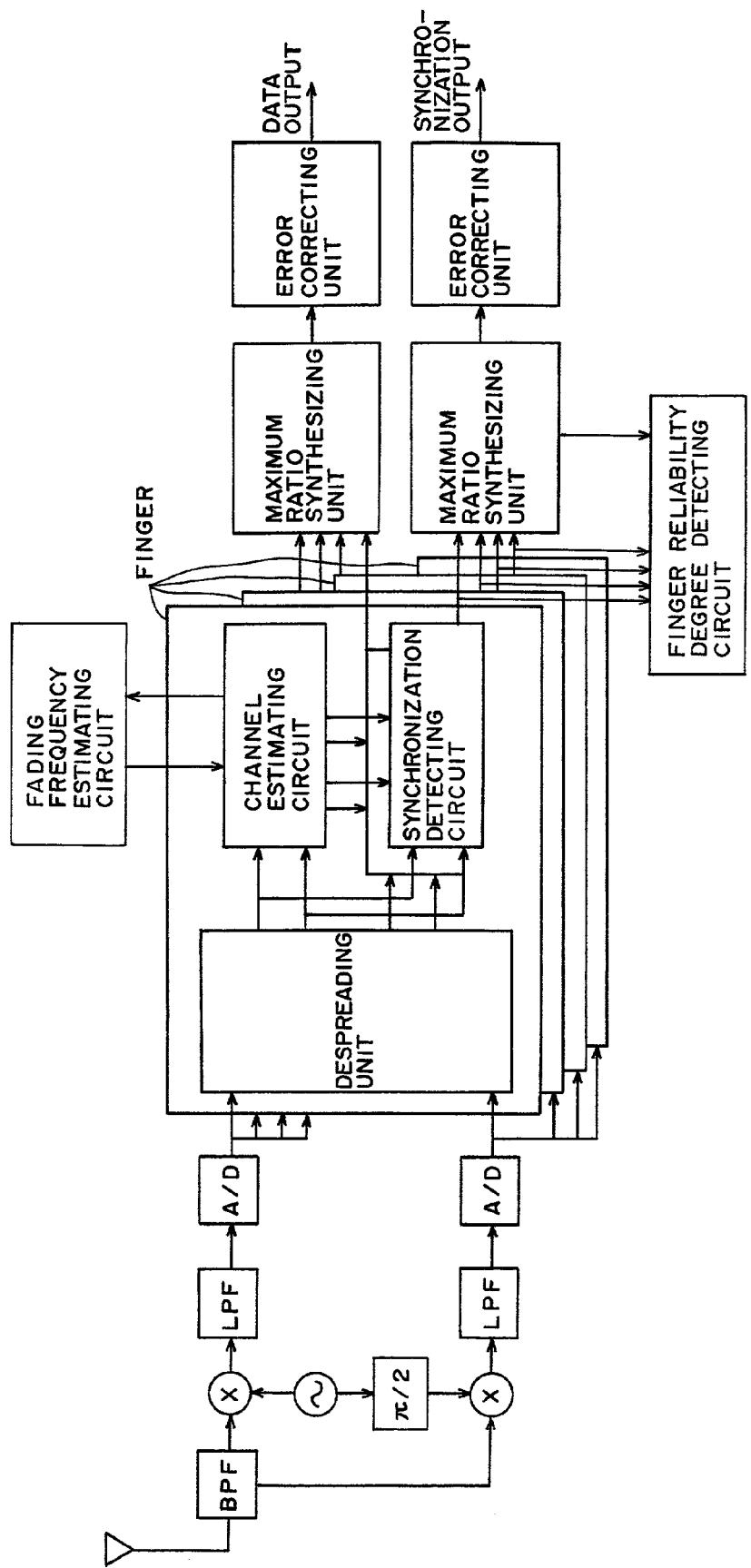
FIG. 20 exemplifies the configuration of the receiver according to the seventh preferred embodiment of the present invention.

FIG. 20 exemplifies the configuration of the receiver according to the seventh preferred embodiment of the present invention.

If the correlation between a channel estimation value and an SW is strong, an SW does not become erroneous even if no reception signal exists. A diversity gain is further expected at the time of RAKE reception. As a result, an error rate becomes lower, and the state is apt to become a synchronization state only with noise but with no signal. Therefore, as shown in FIG. 20, a finger reliability degree detecting circuit is arranged, the degree of reliability of an output from each finger is detected, outputs of fingers with high degrees of reliability are synthesized a a maximum ratio for SW signal demodulation, and SW detection is made, so that a diversity gain is reduced in a state where there is no signal. Here, the degree of reliability of each finger is, for example, the strength of the correlation value output from each finger. It is determined that as the strength of the correlation value increases, so does the degree of reliability of reception. A finger with a high strength of the correlation value is selected, and the above described method is applied.

According to the present invention, the correlation between channel estimation and an SW is weakened, thereby properly detecting the SW.

What is claimed is:

1. A synchronization detecting apparatus making synchronization detection by using a pilot signal that comprises a plurality of bits and at least one bit of said plurality of bits is used as a synchronization signal, comprising:
   a channel estimating unit making channel estimation by using the pilot signal from which a predefined part of the pilot signal is removed; and
   a synchronization signal demodulating unit demodulating said at least one bit of the synchronization signal by using a result of the channel estimation, wherein
   said predefined part is defined for each target bit of the synchronization signal to be demodulated and is defined so as to include the target bit; and
   synchronization detection is made by using the demodulated synchronization signal.

2. The synchronization detecting apparatus according to claim 1, wherein
   said predefined part is a slot including the target bit of the synchronization signal.

3. The synchronization detecting apparatus according to claim 1, wherein said channel estimating unit divides signal bits used for channel estimation into groups, and said predefined part is a group including the target bit of the synchronization signal.

4. The synchronization detecting apparatus according to claim 1, wherein said predefined part is the target bit.

5. The synchronization detecting apparatus according to claim 1, wherein said channel estimating unit also serves as a channel estimating unit for demodulating data.

6. The synchronization detecting apparatus according to claim 1, wherein said channel estimating unit makes weight coefficients, which are applied to a process result of each slot, different from weight coefficients for data demodulation, which are used at the time of channel estimation, when making the channel estimation.

7. The synchronization detecting apparatus according to claim 1, wherein weight coefficients, which are applied to each slot at the time of channel estimation, are varied according to reception quality information obtained from a reception quality estimating circuit.

8. The synchronization detecting apparatus according to claim 1, wherein weight coefficients, which are applied to each slot at the time of channel estimation, are varied according to a fading speed obtained from a fading frequency estimating circuit.

9. The synchronization detecting apparatus according to claim 1, wherein synchronization detection is made by setting at least one parameter of parameters for synchronization detection, which comprise a parameter indicating a number of error-tolerable bits of the synchronization signal, a parameter indicating a number of backward guard stages, and a parameter indicating a number of forward guard stages, according to a state of a propagation path wherein the state is indicated by at least one of reception quality information obtained from a reception quality estimating circuit, a fading speed obtained from a fading frequency estimating circuit, and a number of pilot symbols.

10. The synchronization detecting apparatus according to claim 1, wherein synchronization detection is made by using an output of a path having a largest correlation value among outputs of a RAKE receiver of a code division multiple access receiving device.

11. A synchronization detecting method for synchronization detection by using a pilot signal that comprises a plurality of bits and at least one bit of said plurality of bits is used as a synchronization signal, comprising:
    performing channel estimation by using the pilot signal from which a predefined part of the pilot signal is removed; and
    demodulating the at least one bit of the synchronization signal by using a result of the channel estimation, wherein
    said predefined part is defined for each target bit of the synchronization signal to be demodulated and is defined so as to include the target bit; and
    synchronization detection is made by using the demodulated synchronization signal.

12. A synchronization detecting apparatus making synchronization detection of a signal comprising a plurality of slots by using the signal having a pilot signal that includes a synchronization signal within each slot, comprising:
    a channel estimating unit making channel estimation by using, from the signal having the plurality of slots, the pilot signal with the synchronization signal removed in the slot to be demodulated, and using the pilot signal having the synchronization signal in another slot other than the slot to be demodulated; and
    a synchronization signal demodulating unit demodulating the signal having the synchronization signal in the slot to be demodulated by using a result of the channel estimation, wherein
    the synchronization detection is made by using the demodulated synchronization signal.

* * * * *